(12) United States Patent
Then et al.

(10) Patent No.: US 10,133,827 B2
(45) Date of Patent: Nov. 20, 2018

(54) AUTOMATIC GENERATION OF MULTI-SOURCE BREADTH-FIRST SEARCH FROM HIGH-LEVEL GRAPH LANGUAGE

(71) Applicant: Oracle International Corporation, Redwood Shores, CA (US)

(72) Inventors: Manuel Then, Redwood Shores, CA (US); Sungpack Hong, Palo Alto, CA (US); Martin Sevenich, Palo Alto, CA (US); Hassan Chafi, San Mateo, CA (US)

(73) Assignee: Oracle International Corporation, Redwood Shores, CA (US)

( * ) Notice: Subject to any disclaimer, the term of this patent is extended or adjusted under 35 U.S.C. 154(b) by 588 days.

(21) Appl. No.: 14/710,117

(22) Filed: May 12, 2015

(65) Prior Publication Data

US 2016/0335322 A1 Nov. 17, 2016

(51) Int. Cl.
*G06F 17/30* (2006.01)
(52) U.S. Cl.
CPC .............................. *G06F 17/30958* (2013.01)
(58) Field of Classification Search
CPC ............... G06F 17/30; G06F 17/30516; G06F 17/30477; G06F 17/30867
See application file for complete search history.

(56) References Cited

U.S. PATENT DOCUMENTS

| | | |
|---|---|---|
| 6,883,161 B1 | 4/2005 | Chovin et al. |
| 7,366,842 B1 * | 4/2008 | Acocella ............... G06F 5/065 711/110 |
| 7,478,375 B1 | 1/2009 | Kersters |
| 7,805,454 B2 | 9/2010 | Zhou |
| 8,019,785 B2 | 9/2011 | Moir et al. |

(Continued)

OTHER PUBLICATIONS

Hiroki Yanagisawa, A Multi-Source Label-Correcting Algorithm for the All-Pairs Shortest Paths Problem, 2010; IEEE; pp. 1-10.*

(Continued)

*Primary Examiner* — Scott A. Waldron
*Assistant Examiner* — Fatima P Mina
(74) *Attorney, Agent, or Firm* — Hickman Palermo Becker Bingham LLP

(57) ABSTRACT

Techniques are described herein for automatic generation of multi-source breadth-first search (MS-BFS) from high-level graph processing language. In an embodiment, a method involves a computer analyzing original software instructions. The original software instructions are configured to perform multiple breadth-first searches to determine a particular result. Each breadth-first search originates at each of a subset of vertices of a graph. Each breadth-first search is encoded for independent execution. Based on the analyzing, the computer generates transformed software instructions configured to perform a MS-BFS to determine the particular result. Each of the subset of vertices is a source of the MS-BFS. In an embodiment, parallel execution of the MS-BFS is regulated with batches of vertices. In an embodiment, the original software instructions are expressed in Green-Marl graph analysis language. In an embodiment, the transformed software instructions are expressed in a general purpose programming language such as C, C++, Python, or Java.

20 Claims, 8 Drawing Sheets

(56) References Cited

U.S. PATENT DOCUMENTS

| | | |
|---|---|---|
| 8,234,233 B2 | 12/2012 | Zhou |
| 8,910,134 B2 | 12/2014 | Hong et al. |
| 8,949,811 B2 | 2/2015 | Murthy |
| 9,092,481 B2 | 7/2015 | Digaha |
| 2004/0194074 A1 | 9/2004 | Shibayama |
| 2005/0278451 A1 | 12/2005 | Yamashita |
| 2006/0195463 A1 | 8/2006 | Bogner |
| 2011/0055511 A1 | 3/2011 | Mantor |
| 2011/0099541 A1 | 4/2011 | Blomstedt |
| 2011/0138369 A1 | 6/2011 | Chandra |
| 2011/0276962 A1 | 11/2011 | Chambers |
| 2013/0086354 A1* | 4/2013 | Satish .............. G06F 9/52 712/16 |
| 2013/0097136 A1 | 4/2013 | Goldberg |
| 2013/0139135 A1 | 5/2013 | Ditu |
| 2014/0019949 A1 | 1/2014 | Craymer |
| 2014/0122812 A1 | 5/2014 | Hakura |
| 2014/0137130 A1 | 5/2014 | Jacob |
| 2014/0189665 A1 | 7/2014 | Hong et al. |
| 2014/0244687 A1 | 8/2014 | Shmueli |
| 2014/0306964 A1 | 10/2014 | Reddish |
| 2014/0310619 A1 | 10/2014 | Fickenwirth |
| 2014/0351820 A1 | 11/2014 | Lee |
| 2015/0007154 A1 | 1/2015 | Bharadwaj |
| 2015/0040110 A1 | 2/2015 | Adl-Tabatabai |
| 2015/0095698 A1 | 4/2015 | Ema |
| 2015/0128151 A1 | 5/2015 | Rak |
| 2015/0178405 A1 | 6/2015 | Hong et al. |
| 2015/0331683 A1 | 11/2015 | Sevenich et al. |
| 2015/0350324 A1 | 12/2015 | Hu et al. |
| 2015/0355891 A1 | 12/2015 | Angerer |
| 2016/0019228 A1 | 1/2016 | Hong |
| 2016/0048607 A1 | 2/2016 | Raman |
| 2016/0306896 A1 | 2/2016 | Paradies et al. |
| 2016/0062776 A1 | 3/2016 | Stanfill |
| 2016/0117358 A1 | 4/2016 | Schmid |
| 2016/0364220 A1 | 12/2016 | Arai |
| 2017/0024192 A1 | 1/2017 | Hong et al. |
| 2017/0168779 A1 | 6/2017 | Sevenich |

OTHER PUBLICATIONS

U.S. Appl. No. 14/805,882, filed Jul. 22, 2015, Notice of Allowance, dated May 19, 2016.

U.S. Appl. No. 14/805,882, filed Jul. 22, 2015, Office Action, dated Feb. 4, 2016.

Hong et al., "Simplifying Scalable Graph Processing with a Domain-Specific Language", ADM, CGO'14, pp. 208-218.

Hong et al., "Early Experiences in Using a Domain-Specific Language for Large-Scale Graph Analysis", ACM, Grades, dated 2013, pp. 1-6.

Yuechao, et al., "Multi-GPU Graph Analytics", dated Apr. 19, 2015, 12 pages.

Lopez, Karen, "Your Master Data is a Graph: Are You Ready?", Oracle, dated Mar. 2015, 14 pages.

Hang et al., "iBFS: Concurrent Breadth-First Search on GPUs", SIGMOD, dated Jun. 26, 2016, ACM, 14 pages.

Ariful et al., "A Parallel Tree Grafting Algorithm for Maximum Cardinality Matching in Bipartite Graphs", dated May 25, 2015, 10 pages.

Then et al., "The More the Merrier: Efficient Multi-Source Graph Traversal", Proceedings of the VLDB Endowment, vol. 8 Issue 4, Dec. 2014, 12 pages.

Hong et al. "Green-Marl: A DSL for Easy and Efficeient Graph Analysis", ASPLOS' dated Mar. 2012, 14 pages.

Sevenich et al., "Using Domain-Specific Languages for Analytic Grpah Database", VLDB Endowment, dated Sep. 2016, pp. 1257-1268.

Schiller et al., "Efficient Data Structures for Dynamic Graph Analysis", IEEE, dated Nov. 2015, pp. 497-504.

Hong et al. "Green-Marl: A DSL for East and Efficient Grpah Analysis", ACM, ASPLOS, dated Mar. 2012, pp. 349-362.

U.S. Appl. No. 14/805,882, filed Jul. 22, 2015, Notice of Allowance, dated Sep. 28, 2016.

Perez et al., "Ringo: Interactive Graph Analytics on Big-Memory Machines", ACM, SIGMOD, dated May 2015, 6 pages.

Banerjee et al., "Towards Logical Level Design of Big Data", dated Jul. 2015, 7 pages.

Bak et al., "A Reference Interpreter for the Graph Programming Language GP 2", Proc. Graphs as Models (GaM 2015), vol. 181, dated Apr. 2015, 17 pages.

Sevenich, U.S. Appl. No. 14/969,231, filed Dec. 15, 2015, Notice of Allowance, dated Jan. 11, 2018.

Sevenich, U.S. Appl. No. 14/969,231, filed Dec. 15, 2015, Office Action, dated Sep. 8, 2017.

* cited by examiner

AUTOMATIC GENERATION OF MULTI-SOURCE BREADTH-FIRST SEARCH FROM HIGH-LEVEL GRAPH LANGUAGE

TECHNICAL FIELD

Embodiments relate generally to automatic analysis of a logical graph. Automatic analysis is accelerated through program transformation.

BACKGROUND

Graph analysis is a recently popularized way of analyzing data, which considers not only properties of entities but also relationships between entities. Many algorithms for graph analysis are based on breadth-first search (BFS). BFS systematically traverses a graph from a source vertex to vertices of increasing distance away. The distance may be determined by the number of traversed edges from a respective source vertex. All vertices of a given distance from the source vertex are processed before BFS expands the distance to include vertices one edge further away. BFS repeatedly expands the distance until all vertices of a graph are reached or until a termination condition occurs.

Some graph algorithms entail running multiple BFSs from different source vertices in a graph. Examples of such algorithms include closeness centrality and betweenness centrality. Existing systems solve this problem by running all necessary BFSs independently. These systems do not leverage shared computation between the BFSs. Consequently, many graph traversals are made redundantly, which costs extra time, space, and energy.

A technique, referred to herein as multi-source BFS (MS-BFS), enables fast computation of multiple BFSs by efficiently performing several simultaneous instances of BFS traversals. Hence, the MS-BFS technique provides performance benefits. A generic MS-BFS may be implemented as an encapsulated function that an application may directly invoke from user logic. User logic may specify processing to occur on each visited node or edge and what conditions terminate each search.

However with user logic that mixes non-trivial analysis and independent BFSs, users may be challenged to retrofit the MS-BFS technique into their graph analysis, because consolidating independent BFSs can be complicated. Specifically, users may need to combine fragile analytic logic with complicated MS-BFS traversal logic, which is not straightforward. Hand coding to manage an execution context required by analytic logic during a traversal is error prone and difficult to optimize.

BRIEF DESCRIPTION OF THE DRAWINGS

The present invention is illustrated by way of example, and not by way of limitation, in the figures of the accompanying drawings and in which like reference numerals refer to similar elements and in which.

DETAILED DESCRIPTION

In the following description, for the purposes of explanation, numerous specific details are set forth in order to provide a thorough understanding of the present invention. It will be apparent, however, that the present invention may be practiced without these specific details. In other instances, well-known structures and devices are shown in block diagram form in order to avoid unnecessarily obscuring the present invention.

Embodiments are described herein according to the following outline:

1.0 General Overview
2.0 Example Search Compiler System
3.0 Example Search Compilation Process
4.0 Green-Marl Loop
5.0 Vertex Batches and Scalar Variable Replicas
6.0 Vertex Batches and Conditional Branches
7.0 Partitioned Batches for Horizontal Scaling
8.0 Partitioned Batches for Memory Tiers
9.0 Hardware Overview
10.0 Extensions and Alternatives 1.0. General Overview Techniques are described herein for automatic generation of multi-source breadth-first search from high-level graph processing language. In an embodiment, a method involves a computer analyzing original software instructions. The original software instructions are configured to perform multiple explicitly specified breadth-first searches to determine a particular result. Each breadth-first search originates at each of a subset of vertices of a graph. Each breadth-first search is encoded for independent execution, perhaps as independent iterations of a for loop such that each breadth-first search instance or iteration may operate without depending on the other instances for data. Based on the analyzing, the computer generates transformed software instructions that are configured to perform a multi-source breadth-first search to determine the particular result. Each of the subset of vertices is a source of the multi-source breadth-first search.

In an embodiment, parallel execution of the multi-source breadth-first search is regulated with batches of vertices.

In an embodiment, the original software instructions are expressed in the Green-Marl graph analysis language.

In an embodiment, the transformed software instructions are expressed in a general purpose programming language such as C, C++, Python, or Java.

2.0 Example Search Computer System

Figure 1:
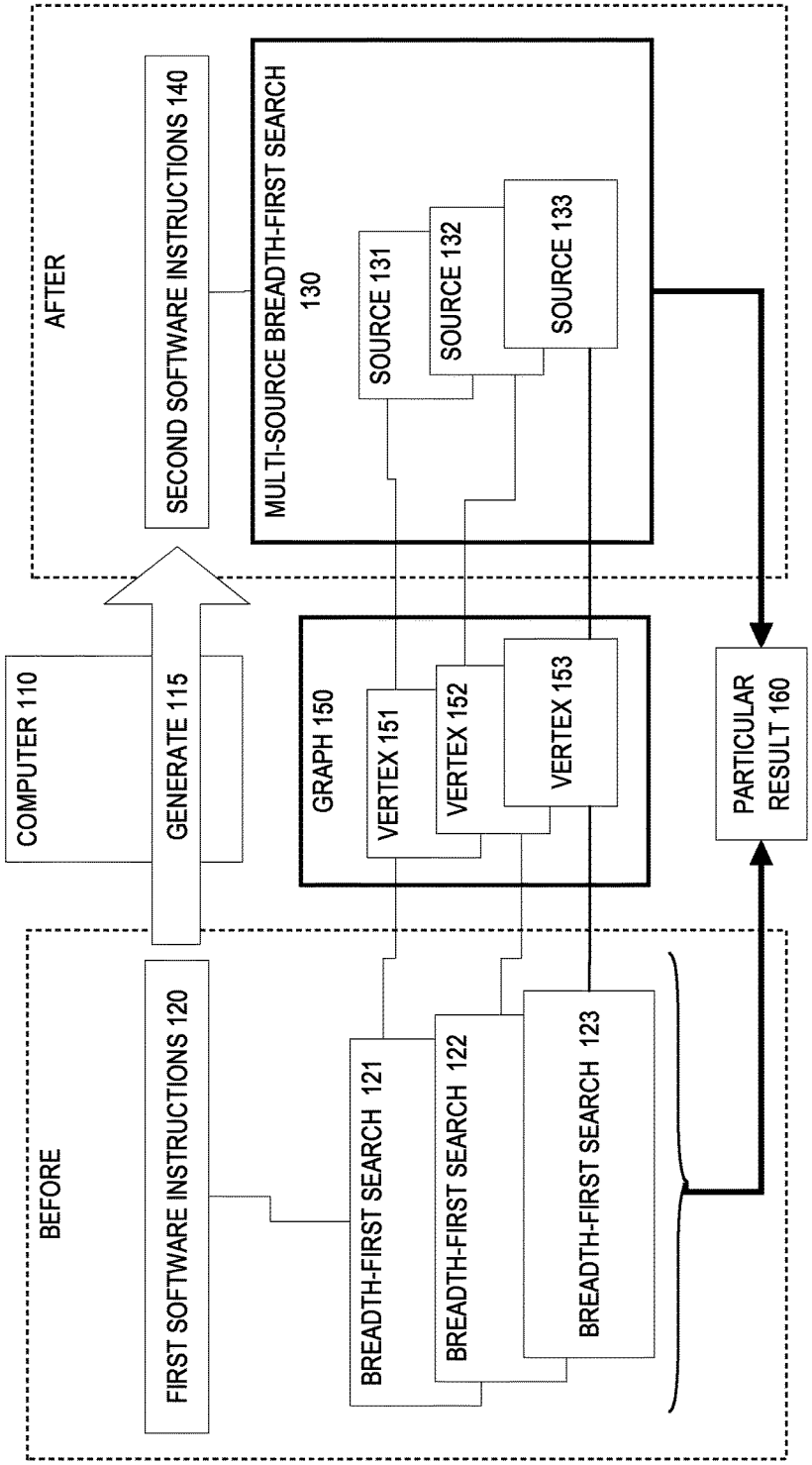
FIG. 1 is a logical block diagram illustrating an example search compiler system in which certain techniques described herein may be implemented, according to various embodiments.

FIG. 1 illustrates a block diagram of example search compiler system 100, in which techniques described herein may be practiced. Search compiler system 100 automatically generates a multi-source breadth-first search. Search compiler system 100 includes computer 110, first software instructions 120, and second software instructions 140. First software instructions 120 and second software instructions 140 comprise graph analysis logic. First software instructions 120, and perhaps second software instructions 140, are expressed as statements in a high level graph processing language.

First software instructions 120 are configured to analyze graph 150. Graph 150 has many vertices, such as at least vertices 151-153, that are interconnected by edges. Graph 150 may be directed or undirected. Graph 150 may be cyclic or acyclic. Graph 150 may be connected or disconnected.

First software instructions 120 are configured to perform multiple explicitly specified breadth-first searches, such as at least breadth-first searches 121-123. Breadth-first search is an algorithm that traverses edges of a graph to visit vertices one after another. Breadth-first search starts at a source vertex. Each vertex that breadth-first search visits is visited only once. Breadth-first search may stop after visiting all vertices of a graph or sooner if a termination criterion is met, such as reaching a particular node. Breadth-first search visits vertices in order of increasing distance from the source vertex.

First software instructions 120 may be configured to perform any of a wide variety of graph analysis algorithms that involve multiple breadth-first searches. For example, first software instructions 120 may perform graph analytics according to a specific algorithm from such broad categories of algorithms as graph centrality, network flow, and all-pairs shortest paths. A legacy program that performs graph centrality as independent breadth-first searches may be difficult to re-instrument by hand to properly invoke a reusable MS-BFS function. However, search compiler system 100 may automatically accomplish such re-instrumentation.

Each of breadth-first searches 121-123 starts at a different source vertex, such as vertices 151-153 respectively. Graph 150 may have more vertices than are sources of searches. Breadth-first searches 121-123 are based on a shared logic that is part of first software instructions 120. Breadth-first searches 121-123 may be configured to proceed serially or in parallel, such as each search in a separate thread. Each vertex of graph 150 may be visited by none, one, or many of breadth-first searches 121-123. Redundant processing is a consequence of a vertex being visited by multiple searches.

Although an embodiment need not execute first software instructions 120, computer 110 performs static analysis of first software instructions 120. Computer 110 may be a personal computer, a smart phone, a rack server such as a blade, a mainframe, or an aggregation of networked computers such as a Beowulf cluster, perhaps configured for bulk synchronous parallelism such as MapReduce. Computer 110 may have special processors such as a multicore processor or a graphics processor or other vector processor.

During analysis, computer 110 scans first software instructions 120 for explicitly specified breadth-first searches that are based on a shared logic, such as breadth-first searches 121-123. Computer 110 combines breadth-first searches 121-123 into multi-source breadth-first search 130. A multi-source breadth-first search is an optimized combination of multiple equivalent breadth-first searches that each originates from a different source node. Equivalent here means that for each source node a same code is executed, such as the inner logic discussed for FIG. 3. Note that the control flow may differ between source nodes, as discussed for FIG. 5.

A multi-source breadth-first search optimizes by avoiding redundant processing that is a consequence of a vertex being visited by multiple searches. Optimization may reduce demand for time or space. Optimization relies on sharing or reusing the results of computations that occur during traversals of subgraphs that are common to more than one individual breadth-first search. Such sharing may be achieved with, perhaps distributed, shared memory or another data sharing mechanism.

Multi-source breadth-first search 130 may specify sequential or parallel processing. Task parallelism is well suited for multi-source breadth-first search 130. Task parallelism may be fine grained, with a separate thread for each source vertex or each neighbor vertex at a same level of a search. Task parallelism may be coarse grained, with some or all vertices sharing a thread. Multi-source breadth-first search 130 need not agree with breadth-first searches 121-123 as to whether parallel or sequential processing is used. Although both multi-source breadth-first search 130 and breadth-first searches 121-123 may be parallel, multi-source breadth-first search 130 need not have a same granularity of parallelism as breadth-first searches 121-123.

Computer 110 derives multi-source breadth-first search 130 based on the shared logic of breadth-first searches 121-123. The source vertices of multi-source breadth-first search 130 are the same as the source vertices of breadth-first searches 121-123. During generate 115, computer 110 generates second software instructions 140 based on the analysis of first software instructions 120. Second software instructions 140 are configured to perform multi-source breadth-first search 130. Second software instructions 140 may be configured for dynamic parallelism. For example, second software instructions 140 may detect a presence and extent of multiprocessing hardware and select a partitioning scheme based on that detection.

An embodiment need not execute second software instructions 140. If executed, both software instructions 120 and 140 would produce the same particular result 160 when processing graph 150. Computer 110 need not ever access graph 150. Graph 150 need not exist during generate 115. Second software instructions 140 may be reused to process graphs other than graph 150.

3.0 Example Search Compilation Process

Figure 2:
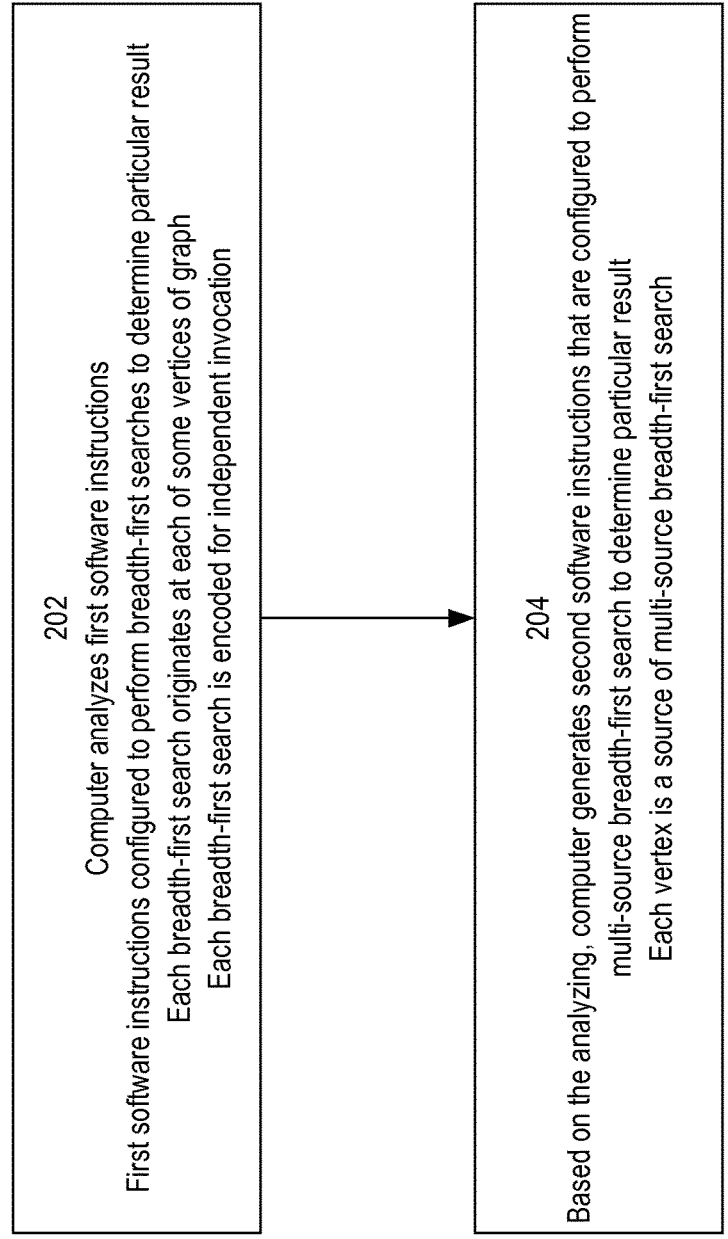
FIG. 2 illustrates an example process for compiling a search algorithm according to various embodiments.

FIG. 2 illustrates example search compilation process 200 that automatically generates a multi-source breadth-first search from high-level graph language, according to an embodiment. For explanatory purposes, search compilation process 200 may be discussed with reference to FIG. 1. For example, computer 110 performs search compilation process 200.

In step 202, original instructions are analyzed. For example, first software instructions 120 are configured to perform similar breadth-first searches 121-123. Computer 110 analyzes first software instructions 120 to detect explicitly specified breadth-first searches 121-123. To accomplish this, computer 110 may load or stream first software instructions 120 from memory, disk, or over a network. Computer 110 may have a lexer, parser, or compiler that processes first software instructions 120 according to a grammar, syntax, or language specification of a high level graph processing language that first software instructions 120 conform to.

Computer 110 may construct an abstract syntax tree or other data structure that represents first software instructions 120 in a format amenable to analysis. Computer 110 may perform syntactic, semantic, or other static analysis of first software instructions 120, such as data- or control-flow analysis or recognition of structural or behavioral patterns. Semantic analysis may regard denotational semantics, axiomatic semantics, operational semantics, or abstract interpretation. Analysis of first software instructions 120 may involve constraint checking of bread-first searches 121-123 and surrounding statements to ensure applicability.

In step 204, generated instructions are derived from original instructions. For example, computer 110 combines breadth-first searches 121-123 into multi-source breadth-first search 130. Computer 110 generates second software instructions 140 based on the analysis of first software instructions 120. Second software instructions 140 are configured to perform multi-source breadth-first search 130. Second software instructions 140 may be configured to perform other multi-source breadth-first searches from other sets of breadth-first searches in first software instructions 120.

Second software instructions 140 may be expressed in a same language as first software instructions 120. Alternatively, second software instructions 140 may be expressed in a general purpose programming language such as C, C++, Python, Pig, Java, or a Java dialect such as Scala. Second software instructions 140 may be expressed in a binary format, such as Java bytecode or executable object code. Computer 110 may use a code generator, a compiler backend, or a cross compiler to generate second software instructions 140. Second software instructions 140 may be configured for a particular shared memory paradigm or a cluster topology, such as Beowulf, MapReduce, or Apache Spark.

4.0 Green-Marl Loop

Figure 3:
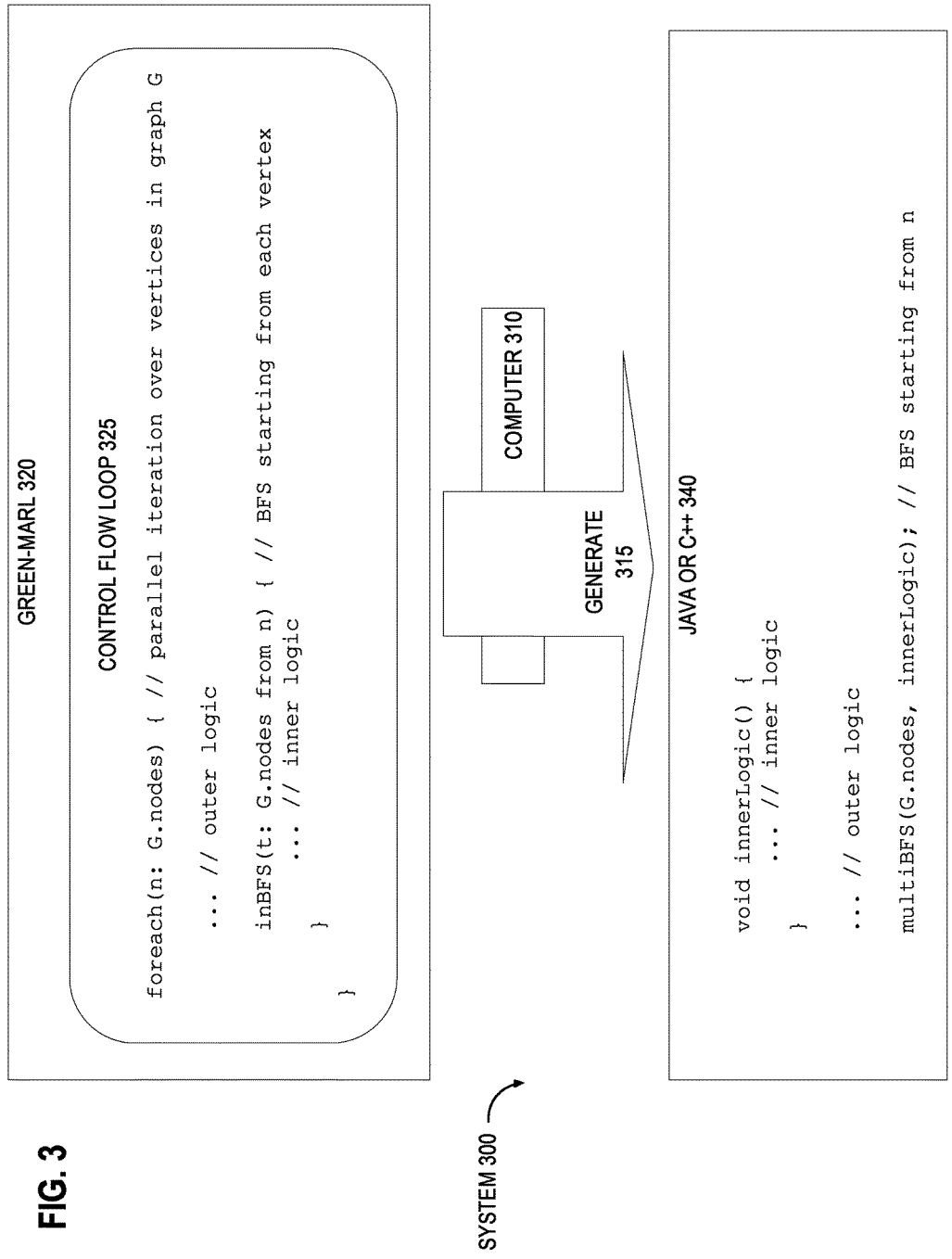
FIG. 3 is a logical block diagram illustrating an example search compiler system in which certain techniques described herein may be implemented, according to various embodiments.

FIG. 3 illustrates a block diagram of example search compiler system 300, in which techniques described herein may be practiced. Search compiler system 300 automatically generates a multi-source breadth-first search from explicitly specified breadth-first searches in iterations of a control flow loop. Search compiler system 300 may be an implementation of search compiler system 100, although search compiler system 100 may have other implementations. Search compiler system 300 includes computer 310. Computer 310 may be an implementation of computer 110, although computer 110 may have other implementations.

Computer 310 analyzes Green-Marl 320. Green-Marl 320 may be an implementation of first software instructions 120, although first software instructions 120 may have other implementations. In this example, Green-Marl 320 is source code expressed in Green-Marl, a domain specific language (DSL) for graph analysis and invented at Stanford University. Instead of Green-Marl source code, computer 310 may analyze programs written in another DSL or a general purpose programming language. Computer 310 may also analyze a structured binary format, such as Java bytecode.

During analysis, computer 310 scans Green-Marl 320 for a source code pattern such as control flow loop 325. Control flow loop 325 is an iterative loop such as a for loop, a foreach loop, a while loop, a repeat until loop, a do while loop, or other looping flow control idiom that specifies iteration. In this example, control flow loop 325 iterates over all vertices of graph G. In other examples, control flow loop 325 may iterate over an arbitrary subset of vertices of a graph. Although control flow loop 325 specifies iterations, computer 310 may recognize these iterations regardless of whether the iterations specify sequential or parallel execution.

Computer 310 scans Green-Marl 320 for a control flow loop having a body of statements that includes an explicitly specified breadth-first search, such as the invocation of inBFS( ) in control flow loop 325. During generate 315, computer 310 generates Java-or-C++ 340 based on the analysis of Green-Marl 320. Java-or-C++ 340 may be an implementation of second software instructions 140, although second software instructions 140 may have other implementations. Java-or-C++ 340 may have source code of a general purpose programming language such as C, C++, Python, Pig, Java, or a Java dialect such as Scala.

Java-or-C++ 340 is configured to perform a multi-source breadth-first search whose source vertices are the source vertices of control flow loop 325. Java-or-C++ 340 includes translations of the outer logic and inner logic of control flow loop 325. The inner logic of control flow loop 325 specifies processing that occurs during a breadth-first search. In this example, generate 315 extracts the inner logic of control flow loop 325 and encapsulates the inner logic within function innerLogic( ) that can be injected into a generic multi-source breadth-first search harness such as function multiBFS( ). Another embodiment may use a code generation template that does not involve function extraction and injection.

5.0 Vertex Batches and Scalar Variable Replicas

Figure 4:
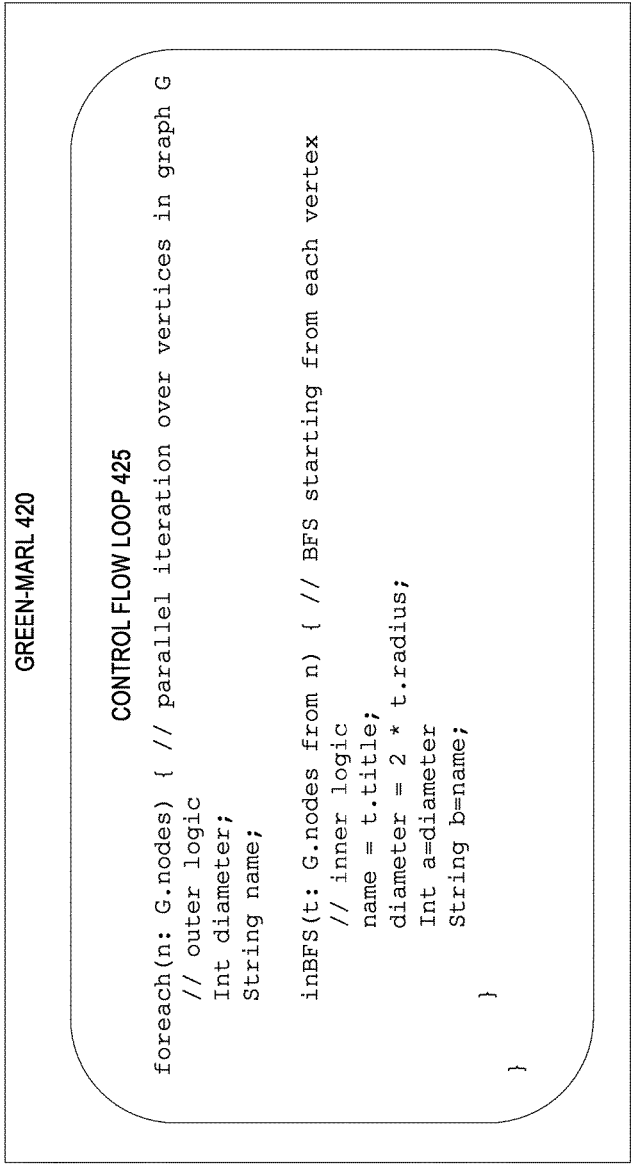
FIG. 4 is a logical block diagram illustrating an example search compiler system in which certain techniques described herein may be implemented, according to various embodiments.

FIG. 4 illustrates a block diagram of example search compiler system 400, in which techniques described herein may be practiced. Search compiler system 400 batches vertices and replicates scalar variables. Search compiler system 400 may be an implementation of search compiler system 100 or 300, although search compiler systems 100 and 300 may have other implementations.

Search compiler system 400 analyzes Green-Marl 420. Green-Marl 420 may be an implementation of first software instructions 120 or Green-Marl 320, although first software instructions 120 and Green-Marl 320 may have other implementations. Green-Marl 420 includes control flow loop 425. Control flow loop 425 may be an implementation of control flow loop 325, although control flow loop 325 may have other implementations.

Search compiler system 400 generates multi-source breadth-first search logic that performs vertex batching. Vertex batching is a technique to limit task parallelism. A multi-source breadth-first search may process each source vertex or each neighbor vertex at a same level in a separate thread. Vertex batching combines vertices into subsets such that each batch processes a subset of vertices. Batches need not have equal amounts of vertices, although symmetry might increase load balancing. Each batch may have its own thread. A batch may be queued while waiting for a spare thread to become available. The vertices of a batch may be sequentially processed.

Memory contention is a hazard of shared memory parallelism such as multi-source breadth-first search. Memory contention imposes risks when variables are shared between threads. This may cause memory consistency race conditions such as write-after-write, read-after-write, or write-after-read. Even without parallelism, vertices of a batch may contend for a scalar variable.

Search compiler system 400 minimizes race conditions by replicating some scalar variables to achieve thread safety by isolation. Search compiler system 400 recognizes scalar variables that are subject to contention, such as diameter and name in control flow loop 425. Search compiler system 400 configures a multi-source breadth-first search to allocate a replica of a scalar variable for each vertex of a batch.

Search compiler system 400 may aggregate replicas of a scalar variable into a vector. For example, a batch of three vertices that accesses scalar variables diameter and name may respectively have vectors 431-432 that aggregate replicas. Because the batch has three vertices, vectors 431-432 each have three replicas of a scalar variable. An embodiment may combine vectors of a batch into an array of multiple columns with one column per vector. For example, vectors 431-432 may be combined into array 440. Each of rows 1-3 has a replica from each of vectors 431-432.

Although not shown as such, the logic of inBFS( ) may contain invocations of additional functions. An additional function may be configured for invocation during processing of a batch. For example, a signature of the additional function may accept a batch of vertices or a vector of a scalar variable as a parameter. However, other functions might not be configured for use from within a batch. Example search compiler system 400 may configure the multi-source breadth-first search logic to invoke these other functions repeatedly, such that into each invocation a respective vertex of a batch or a replica within a vector of a scalar variable is injected into the function.

6.0 Vertex Batches and Conditional Branches

Figure 5:
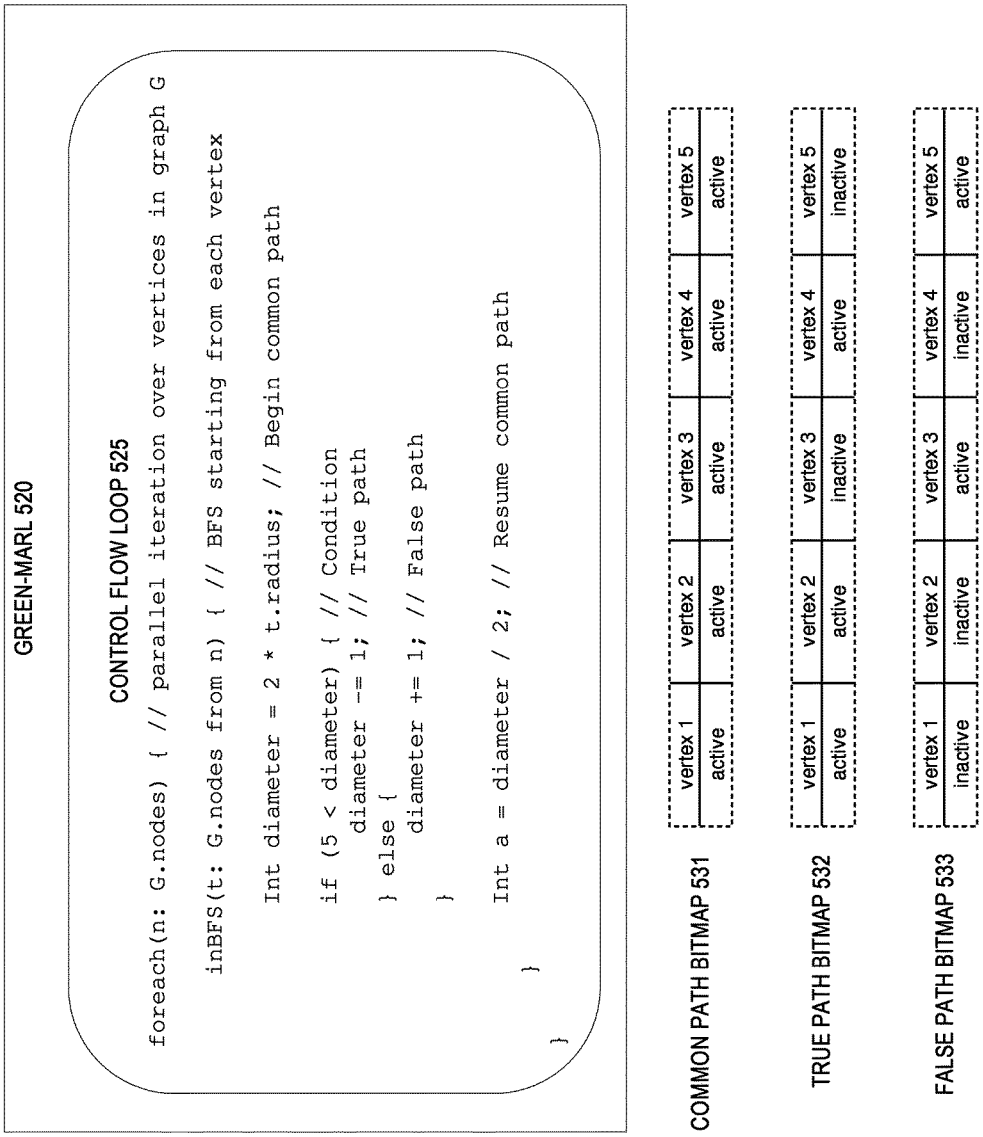
FIG. 5 is a logical block diagram illustrating an example search compiler system in which certain techniques described herein may be implemented, according to various embodiments.

FIG. 5 illustrates a block diagram of example search compiler system 500, in which techniques described herein may be practiced. Search compiler system 500 dynamically configures batches according to branch conditions. Search compiler system 500 may be an implementation of search compiler systems 100, 300, or 400, although search compiler systems 100, 300, and 400 may have other implementations.

Search compiler system 500 analyzes Green-Marl 520. Green-Marl 520 may be an implementation of first software instructions 120 or Green-Marl 320, although first software instructions 120 and Green-Marl 320 may have other implementations. Green-Marl 520 includes control flow loop 525. Control flow loop 525 may be an implementation of control flow loop 325, although control flow loop 325 may have other implementations.

The breadth-first search within control flow loop 525, inBFS( ) has a conditional branch. Control flow of inBFS( ) begins as a common path shared by all vertices of a batch. At runtime, the processing of each vertex of the batch evaluates a condition of the branch, shown as an if statement. Depending on whether the condition evaluates as true or false for a vertex, processing of the vertex respectively proceeds along a particular path. For example, if the condition is true, then the vertex is processed by the true path. Likewise, if the condition is false, then the vertex is processed by the false path.

A consequence of dynamically evaluating the condition for each vertex of the batch is that vertices of the batch may be processed by different paths. When execution of a batch reaches a conditional branch, an embodiment may divide a common batch into path batches, with a path batch for each path that arises from the condition. After the conditional paths finish execution, the path batches may be combined back into a common batch.

An embodiment may track which vertices are processed by which conditional path. For example, an embodiment may maintain a set of vertices as a separate data structure for each batch or path. An embodiment may instead maintain a bitmap for each batch or path that indicates which vertices participate.

For example, if inBFS( ) processes a common batch of five vertices, then that common batch may track included vertices with common path bitmap 531 that indicates that all five vertices are involved. When processing reaches the conditional branch, the common batch may be split into two path batches. The two path batches may track included vertices with path bitmaps 532-533. For example, false path bitmap 533 indicates that vertices 3 and 5 are processed by the false path. When the path batches finish, path bitmaps 532-533 may be discarded, and the common batch may resume processing at a statement immediately below the conditional paths.

7.0 Partitioned Batches for Horizontal Scaling

Figure 6:
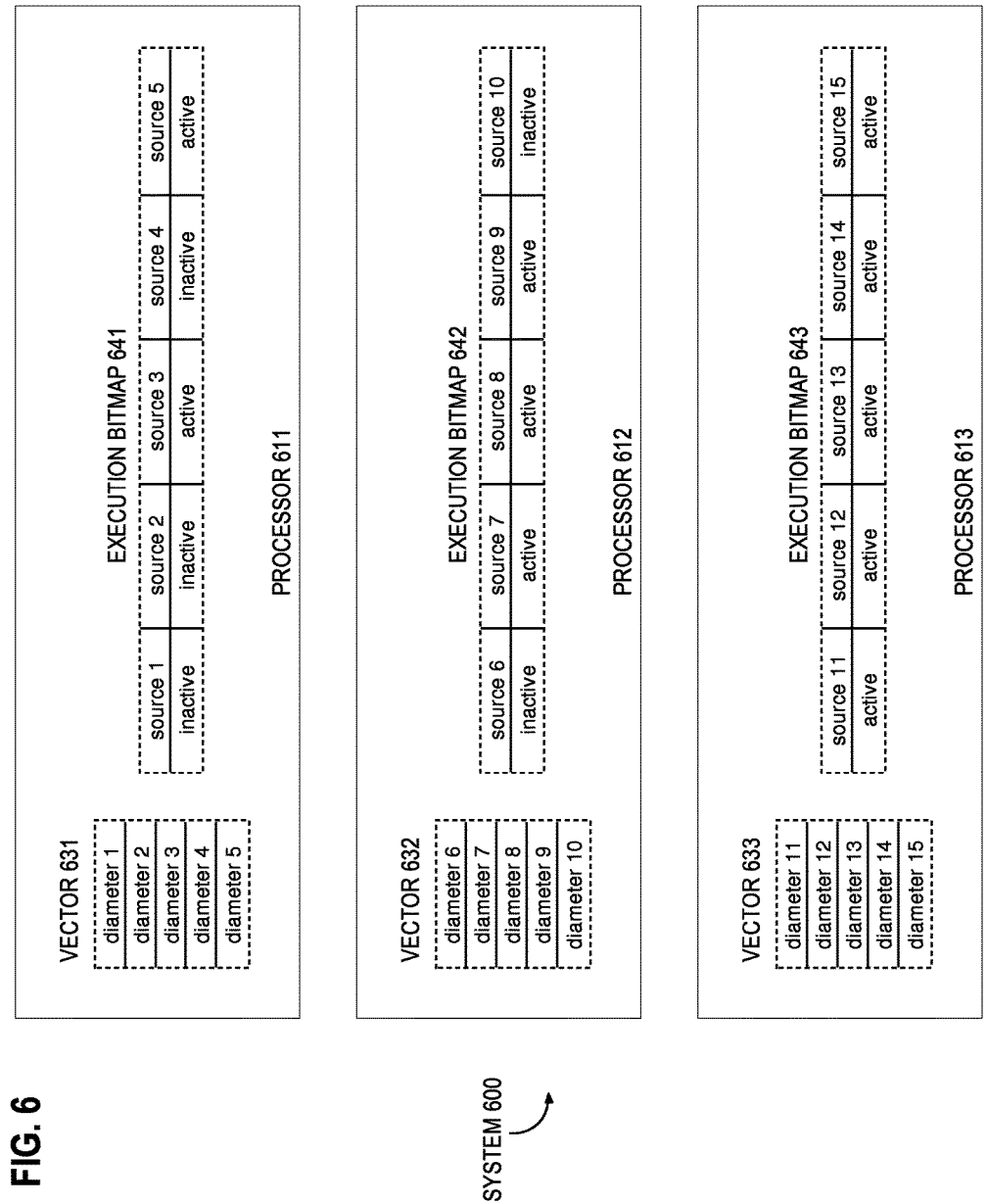
FIG. 6 is a logical block diagram illustrating an example search execution system in which certain techniques described herein may be implemented, according to various embodiments.

FIG. 6 illustrates a block diagram of example search execution system 600, in which techniques described herein may be practiced. Search execution system 600 partitions a big batch into symmetric batches for horizontal scaling. Search execution system 600 may be a runtime environment for a multi-source breadth-first search generated by any of search compiler systems 100, 300, 400, or 500. However, search compiler systems 100, 300, 400, or 500 may generate multi-source breadth-first searches that execute in other runtime environments.

Search execution system 600 includes many processors, such as processors 611-613. Each of processors 611-613 may be a networked computer, a computer card in a shared backplane, a microprocessor in a socket of a shared motherboard, one of multiple cores on a chip, a virtual central processing unit (CPU), one of multiple cores of a virtual CPU, or a simultaneous multithread hardware such as a hyper-thread. Processors 611-613 may be heterogeneous.

At runtime, search execution system 600 may attempt a multi-source breadth-first search as a single batch. However for horizontal scaling, search execution system 600 may divide a big batch into symmetric batches. Search execution system 600 may divide any batch whose size exceeds a threshold into smaller batches. For example, search execution system 600 may divide one or both path batches of a conditional branch into smaller batches. Search execution system 600 may divide a batch into a number of symmetric batches that matches a number of available processors, such as processors 611-613.

When a batch is partitioned, its vectors of scalar variables and execution bitmaps may likewise be partitioned. In this example, search execution system 600 divides a batch of fifteen vertices into three symmetric batches of five vertices each. Instead of a big vector of fifteen replicas of a scalar variable, search execution system 600 produces three vectors 631-633 of five replicas each of the scalar variable. Likewise, instead of a big execution bitmap of fifteen bits, search execution system 600 produces three execution bitmaps 641-643 of five bits each.

8.0 Partitioned Batches for Memory Tiers

Figure 7:
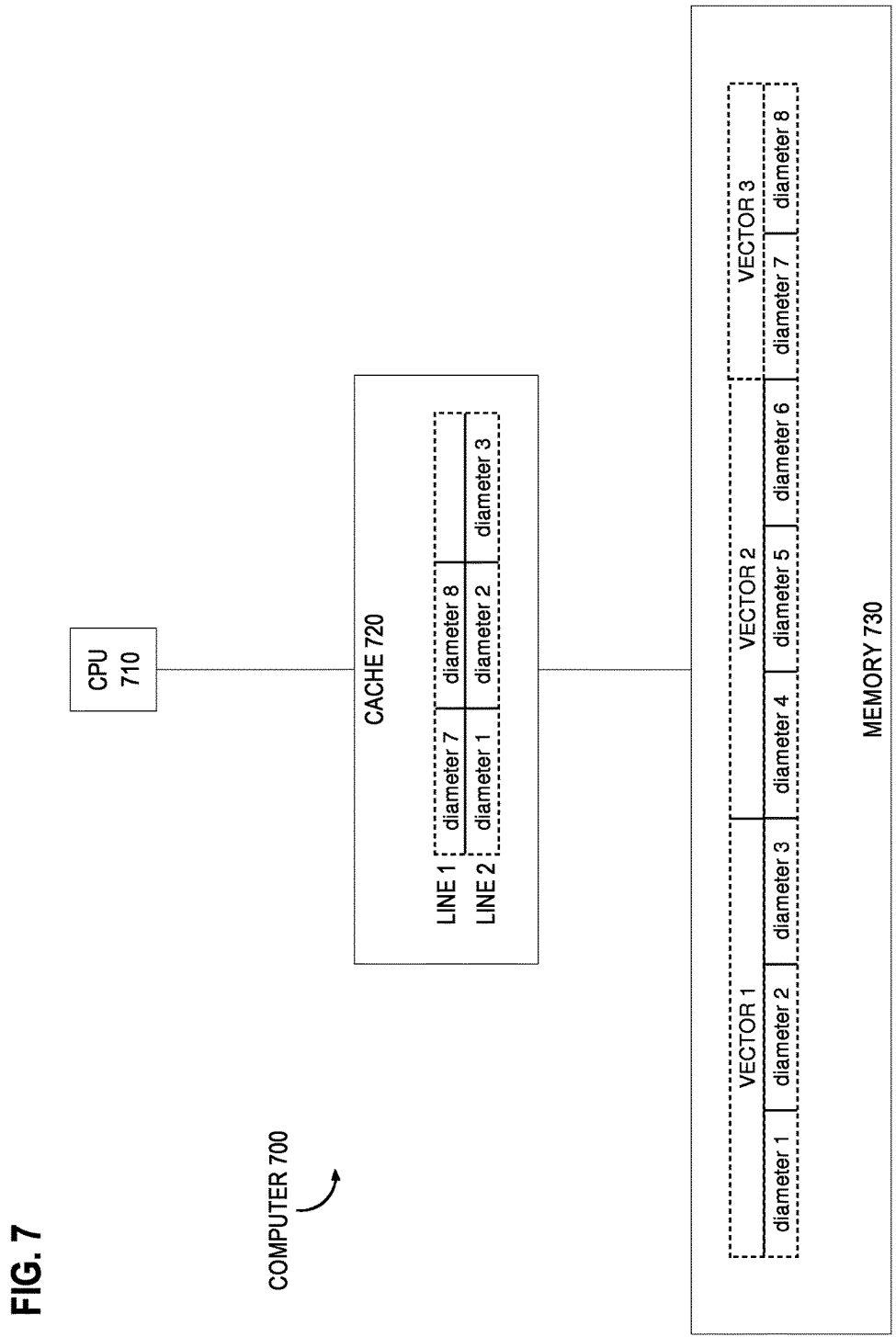
FIG. 7 is a logical block diagram illustrating an example search execution system in which certain techniques described herein may be implemented, according to various embodiments.

FIG. 7 illustrates a block diagram of example search computer 700, in which techniques described herein may be practiced. Search computer 700 partitions a big batch into symmetric batches that each fit into a respective line of a CPU cache. Search computer 700 may be an implementation of processors 611-613, although processors 611-613 may have other implementations.

A CPU cache line is a replica of contiguous bytes that also exist in main memory. Each cache line is atomically loaded or evicted by the cache. A CPU has many cache lines of fixed size. A common cache line size is 64 bytes.

A big data structure, such as a vector of a scalar variable, may span multiple cache lines. Consequentially at a given moment, some portions of the vector might be cached and other portions might not be cached. Such incomplete caching may cause a thread to stall, which diminishes a throughput of a vertex batch.

Search computer 700 may avoid an impact of a stall by partitioning a big batch having a big vector of a scalar variable into tiny batches each having a tiny vector of a scalar variable. A tiny vector may fit entirely in a cache line. If one tiny batch stalls on a cache miss, then another tiny batch whose vector is cached may execute. Hence, a memory bus bottleneck may be overcome by tiny batches.

For example, search computer 700 includes on-chip cache 720, main memory 730, and CPU 710. Search computer 700 may attempt a multi-source breadth-first search as a single batch of eight vertices. The single batch would have a vector of eight replicas of a scalar variable. However, a line of cache 720, such as either line 1 or 2, only has capacity for three replicas. The vector of eight replicas would span multiple cache lines, thereby risking a stall.

Because only three replicas can fit into a cache line, search computer 700 may divide the batch of eight vertices into tiny batches of at most three vertices each. In this example, the partitioning is not perfectly symmetric because eight is not evenly divisible by three. Hence, the big batch is divided into two batches of three vertices and another batch for the remaining two vertices. This partitioning results in vectors 1-3 of scalar variables. In this example, the tiny batch with vector 2 may stall because vector 2 is not cached. However, CPU 710 does not idle because vectors 1 and 3 are cached, and the two batches that respectively have vector 1 or 3 may execute.

FIG. 7 shows cache 720 as a fast tier and memory 730 as a slow tier. However, batch partitioning to accommodate tiered memory is not limited to CPU caching. For example, search computer 700 may have memory 730 as a fast tier and a virtual memory swap file as a slow tier. Instead of partitioning based on cache line size, search computer 700 would partition based on virtual memory page size. In that case, instead of alleviating a memory bus bottleneck, the partitioning would alleviate an input/output (I/O) bottleneck, which may arise from a slow backplane bus or slow disk latency.

9.0 Hardware Overview

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 8:
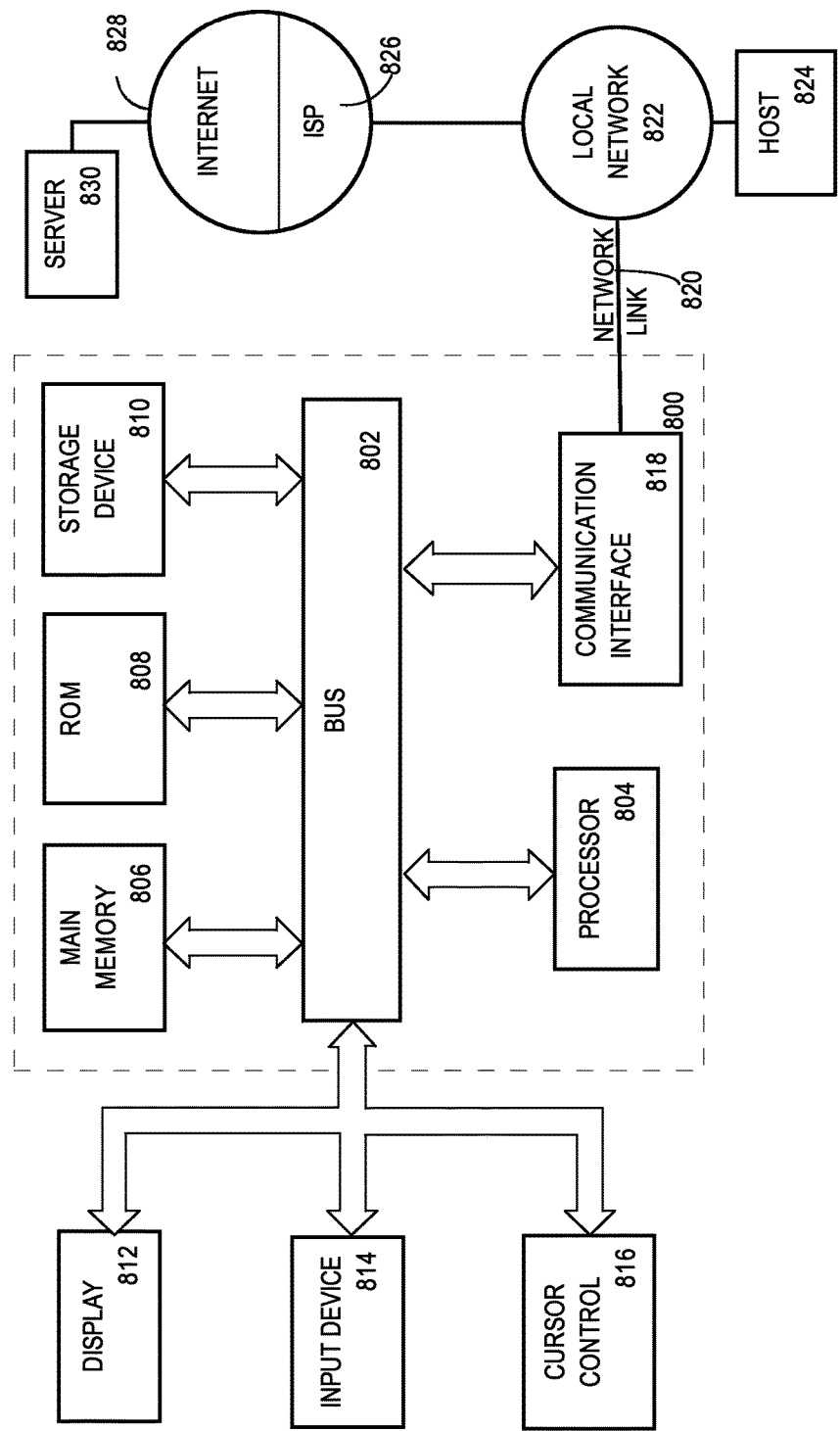
FIG. 8 is a block diagram illustrating one embodiment of a computer system suitable for implementing methods and features described herein.

For example, FIG. 8 is a block diagram that illustrates a computer system 800 upon which an embodiment of the invention may be implemented. Computer system 800 includes a bus 802 or other communication mechanism for communicating information, and a hardware processor 804 coupled with bus 802 for processing information. Hardware processor 804 may be, for example, a general purpose microprocessor.

Computer system 800 also includes a main memory 806, such as a random access memory (RAM) or other dynamic storage device, coupled to bus 802 for storing information and instructions to be executed by processor 804. Main memory 806 also may be used for storing temporary variables or other intermediate information during execution of instructions to be executed by processor 804. Such instructions, when stored in non-transitory storage media accessible to processor 804, render computer system 800 into a special-purpose machine that is customized to perform the operations specified in the instructions.

Computer system 800 further includes a read only memory (ROM) 808 or other static storage device coupled to bus 802 for storing static information and instructions for processor 804. A storage device 810, such as a magnetic disk, optical disk, or solid-state drive is provided and coupled to bus 802 for storing information and instructions.

Computer system 800 may be coupled via bus 802 to a display 812, such as a light emitting diode (LED) display, for displaying information to a computer user. An input device 814, including alphanumeric and other keys, is coupled to bus 802 for communicating information and command selections to processor 804. Another type of user input device is cursor control 816, such as a mouse, a trackball, or cursor direction keys for communicating direction information and command selections to processor 804 and for controlling cursor movement on display 812. This input device typically has two degrees of freedom in two axes, a first axis (e.g., x) and a second axis (e.g., y), that allows the device to specify positions in a plane.

Computer system 800 may implement the techniques described herein using customized hard-wired logic, one or more ASICs or FPGAs, firmware and/or program logic which in combination with the computer system causes or programs computer system 800 to be a special-purpose machine. According to one embodiment, the techniques herein are performed by computer system 800 in response to processor 804 executing one or more sequences of one or more instructions contained in main memory 806. Such instructions may be read into main memory 806 from another storage medium, such as storage device 810. Execution of the sequences of instructions contained in main memory 806 causes processor 804 to perform the process steps described herein. In alternative embodiments, hard-wired circuitry may be used in place of or in combination with software instructions.

The term "storage media" as used herein refers to any non-transitory media that store data and/or instructions that cause a machine to operate in a specific fashion. Such storage media may comprise non-volatile media and/or volatile media. Non-volatile media includes, for example, optical disks, magnetic disks, or solid-state drives, such as storage device 810. Volatile media includes dynamic memory, such as main memory 806. Common forms of storage media include, for example, a floppy disk, a flexible disk, hard disk, solid-state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 802. Transmission media can also take the form of acoustic or light waves, such as those generated during radio-wave and infra-red data communications.

Various forms of media may be involved in carrying one or more sequences of one or more instructions to processor 804 for execution. For example, the instructions may initially be carried on a magnetic disk or solid-state drive of a remote computer. The remote computer can load the instructions into its dynamic memory and send the instructions over a telephone line using a modem. A modem local to computer system 800 can receive the data on the telephone line and use an infra-red transmitter to convert the data to an infra-red signal. An infra-red detector can receive the data carried in the infra-red signal and appropriate circuitry can place the data on bus 802. Bus 802 carries the data to main memory 806, from which processor 804 retrieves and executes the instructions. The instructions received by main memory 806 may optionally be stored on storage device 810 either before or after execution by processor 804.

Computer system 800 also includes a communication interface 818 coupled to bus 802. Communication interface 818 provides a two-way data communication coupling to a network link 820 that is connected to a local network 822. For example, communication interface 818 may be an integrated services digital network (ISDN) card, cable modem, satellite modem, or a modem to provide a data communication connection to a corresponding type of telephone line. As another example, communication interface 818 may be a local area network (LAN) card to provide a data communication connection to a compatible LAN. Wireless links may also be implemented. In any such implementation, communication interface 818 sends and receives electrical, electromagnetic or optical signals that carry digital data streams representing various types of information.

Network link 820 typically provides data communication through one or more networks to other data devices. For example, network link 820 may provide a connection through local network 822 to a host computer 824 or to data equipment operated by an Internet Service Provider (ISP) 826. ISP 826 in turn provides data communication services through the world wide packet data communication network now commonly referred to as the "Internet" 828. Local network 822 and Internet 828 both use electrical, electromagnetic or optical signals that carry digital data streams. The signals through the various networks and the signals on network link 820 and through communication interface 818, which carry the digital data to and from computer system 800, are example forms of transmission media.

Computer system 800 can send messages and receive data, including program code, through the network(s), network link 820 and communication interface 818. In the Internet example, a server 830 might transmit a requested code for an application program through Internet 828, ISP 826, local network 822 and communication interface 818.

The received code may be executed by processor 804 as it is received, and/or stored in storage device 810, or other non-volatile storage for later execution.

As used herein, the terms "first," "second," "certain," and "particular" are used as naming conventions to distinguish queries, plans, representations, steps, objects, devices, or other items from each other, so that these items may be referenced after they have been introduced. Unless otherwise specified herein, the use of these terms does not imply an ordering, timing, or any other characteristic of the referenced items.

10.0 Extensions and Alternatives

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

What is claimed is:

1. A method comprising:
    a computer detecting that a first plurality of software instructions is configured to perform a plurality of breadth-first searches to determine a particular result, wherein each breadth-first search originates at a respective source vertex of a plurality of source vertices of a graph, wherein each breadth-first search is encoded for independent execution;
    based on the detecting, the computer consolidating the plurality of breadth-first searches into a simultaneous multi-source breadth-first search by transforming the first plurality of software instructions into a second plurality of software instructions that is configured to perform the simultaneous multi-source breadth-first search to determine the particular result, wherein each source vertex of the plurality of source vertices is a source of the simultaneous multi-source breadth-first search;
    the computer executing, or sending or storing for execution, said second plurality of software instructions to perform said simultaneous multi-source breadth-first search.

2. The method of claim 1 wherein the first plurality of software instructions comprises a control flow loop, wherein the control flow loop is configured to iterate once per each of the plurality of source vertices, wherein the control flow loop is configured to determine the particular result, wherein the computer detecting comprises the computer identifying the control flow loop, wherein the second plurality of software instructions does not comprise the control flow loop.

3. The method of claim 1 wherein the first plurality of software instructions comprise a plurality of scalar assignments and a plurality of scalar expressions, wherein each scalar assignment writes one of a plurality of variables, wherein each scalar expression reads at least one of the plurality of variables, wherein the computer detecting comprises the computer identifying the plurality of scalar assignments and the plurality of scalar expressions, wherein the computer generating comprises: the computer generating a vector element assignment for each scalar assignment, and the computer generating comprises the computer generating a vector element expression for each scalar expression.

4. The method of claim 3 wherein the computer generating a vector element assignment comprises the computer generating an element assignment of a vector, wherein a size of the vector is based on the size of the plurality of source vertices and an amount of central processing units (CPU).

5. The method of claim 3 wherein the computer generating a vector element assignment comprises the computer generating an element assignment of a vector, wherein a size of the vector is based on a cache line size of a CPU.

6. The method of claim 1 wherein the first plurality of software instructions comprise a plurality of first function invocations, wherein each first function invocation takes a scalar argument, wherein the computer detecting comprises the computer identifying the plurality of first function invocations, wherein the computer generating comprises the computer generating, for each of the plurality of first function invocations, a second function invocation that takes a vector argument.

7. The method of claim 1 wherein the first plurality of software instructions comprise a plurality of conditional branches, wherein each conditional branch comprises a plurality of conditional paths, wherein the computer detecting comprises the computer identifying the plurality of conditional branches, wherein the computer generating comprises the computer generating, for each of the plurality of conditional branches, software instructions that determine which sources of the simultaneous multi-source breadth-first search correspond to each of the conditional paths.

8. The method of claim 1 wherein the first plurality of software instructions comprises statements of a domain specific language (DSL).

9. The method of claim 8 wherein the DSL comprises Green-Marl.

10. The method of claim 1 wherein the computer generating comprises the computer generating at least one of: Java source code, Java bytecode, Python, or C++ source code.

11. The method of claim 1 wherein the first plurality of software instructions is configured to calculate at least one of: graph centrality or network flow.

12. One or more non-transient computer readable media comprising a third plurality of instructions that, when executed by one or more processors, cause:
    detecting that a first plurality of software instructions is configured to perform a plurality of breadth-first searches to determine a particular result, wherein each breadth-first search originates at a respective source vertex of a plurality of source vertices of a graph, wherein each breadth-first search is encoded for independent execution;
    based on the detecting, consolidating the plurality of breadth-first searches into a simultaneous multi-source breadth-first search by transforming the first plurality of software instructions into a second plurality of software instructions that is configured to perform the simultaneous multi-source breadth-first search to determine the particular result, wherein each source vertex of the plurality of source vertices is a source of the simultaneous multi-source breadth-first search;
    the computer executing, or sending or storing for execution, said second plurality of software instructions to perform said simultaneous multi-source breadth-first search.

13. The one or more non-transient computer readable media of claim 12 wherein the first plurality of software instructions comprises a control flow loop, wherein the control flow loop is configured to iterate once per each of the plurality of source vertices, wherein the control flow loop is configured to determine the particular result, wherein the third plurality of instructions that cause detecting further cause identifying the control flow loop, wherein the second plurality of software instructions does not comprise the control flow loop.

14. The one or more non-transient computer readable media of claim 12 wherein the first plurality of software instructions comprise a plurality of scalar assignments and a plurality of scalar expressions, wherein each scalar assignment writes one of a plurality of variables, wherein each scalar expression reads at least one of the plurality of variables, wherein the third plurality of instructions that cause detecting further cause identifying the plurality of scalar assignments and the plurality of scalar expressions, wherein the third plurality of instructions that cause generating further cause: generating a vector element assignment for each scalar assignment, and generating a vector element expression for each scalar expression.

15. The one or more non-transient computer readable media of claim 14 wherein the third plurality of instructions that cause generating a vector element assignment further cause generating an element assignment of a vector, wherein a size of the vector is based on the size of the plurality of source vertices and an amount of CPUs.

16. A computer comprising:
    a memory;
    a processor connected to the memory and configured to:
        detect that a first plurality of software instructions stored in the memory is configured to perform a plurality of breadth-first searches to determine a particular result, wherein each breadth-first search originates at a respective source vertex of a plurality of source vertices of a graph, wherein each breadth-first search is encoded for independent execution;
    based on the detecting, consolidating the plurality of breadth-first searches into a simultaneous multi-source breadth-first search by transforming the first plurality of software instructions into a second plurality of software instructions that is configured to perform the simultaneous multi-source breadth-first search to determine the particular result, wherein each source vertex of the plurality of source vertices is a source of the simultaneous multi-source breadth-first search;
    the computer executing, or sending or storing for execution, said second plurality of software instructions to perform said simultaneous multi-source breadth-first search.

17. The computer of claim 16 wherein the first plurality of software instructions comprises a control flow loop, wherein the control flow loop is configured to iterate once per each of the plurality of source vertices, wherein the control flow loop is configured to determine the particular result, wherein the detecting comprises identify the control flow loop, wherein the second plurality of software instructions does not comprise the control flow loop.

18. The computer of claim 16 wherein the first plurality of software instructions comprise a plurality of scalar assignments and a plurality of scalar expressions, wherein each scalar assignment writes one of a plurality of variables, wherein each scalar expression reads at least one of the plurality of variables, wherein the detecting comprises identify the plurality of scalar assignments and the plurality of scalar expressions, wherein the generating comprises: generate a vector element assignment for each scalar assignment, and generate a vector element expression for each scalar expression.

19. The computer of claim 18 wherein the generating a vector element assignment comprises generate an element assignment of a vector, wherein a size of the vector is based on the size of the plurality of source vertices and an amount of central processing units (CPU).

20. The computer of claim 18 wherein the generating a vector element assignment comprises generate an element assignment of a vector, wherein a size of the vector is based on a cache line size of a CPU.

* * * * *